United States Patent [19]

Nash

[11] Patent Number: 4,637,550

[45] Date of Patent: Jan. 20, 1987

[54] DUAL MATERIAL EXHAUST NOZZLE FLAP

[75] Inventor: Dudley O. Nash, Cincinnati, Ohio

[73] Assignee: The United States of America as represented by the Secretary of the Air Force, Washington, D.C.

[21] Appl. No.: 782,332

[22] Filed: Oct. 1, 1985

[51] Int. Cl.$^4$ .............................................. B64C 9/38
[52] U.S. Cl. ........................... 239/265.37; 239/397.5; 239/DIG. 19
[58] Field of Search ............... 239/265.33, 265.37, 239/265.39, 265.41, 397.5, DIG. 19, 451, 455; 244/23 D, 110 B; 60/242, 271

[56] References Cited

U.S. PATENT DOCUMENTS

| | | | |
|---|---|---|---|
| 2,548,485 | 4/1951 | Lubbock | 263/44 |
| 2,910,829 | 11/1959 | Meyer | 239/265.39 |
| 2,926,489 | 3/1960 | Halford et al. | 60/35.6 |
| 2,984,068 | 5/1961 | Eatock | 239/265.41 |
| 3,112,614 | 12/1963 | Ellenburg et al. | 60/35.6 |
| 3,943,703 | 3/1976 | Kronogard | 60/39.16 R |
| 4,074,523 | 2/1978 | Holler et al. | 60/271 |
| 4,201,611 | 5/1980 | Stover | 156/155 |

FOREIGN PATENT DOCUMENTS

| | | | |
|---|---|---|---|
| 833250 | 4/1960 | United Kingdom | 239/265.39 |
| 1233694 | 5/1971 | United Kingdom | 239/265.41 |

*Primary Examiner*—Joseph F. Peters, Jr.
*Assistant Examiner*—Michael J. Forman
*Attorney, Agent, or Firm*—William G. Auton; Donald J. Singer

[57] ABSTRACT

An exhaust nozzle flap capable of resisting high exhaust temperatures of turbojet engines is disclosed. The flap is composed of a two-part structure of high strength metal, in a support member, combined with a heat resistant base member made from a ceramic or carbon-carbon material. The different materials in the base and support members, having substantially different rates of thermal expansion, are not bolted or riveted together, but attached in a unique manner to allow relative movement therebetween.

7 Claims, 1 Drawing Figure

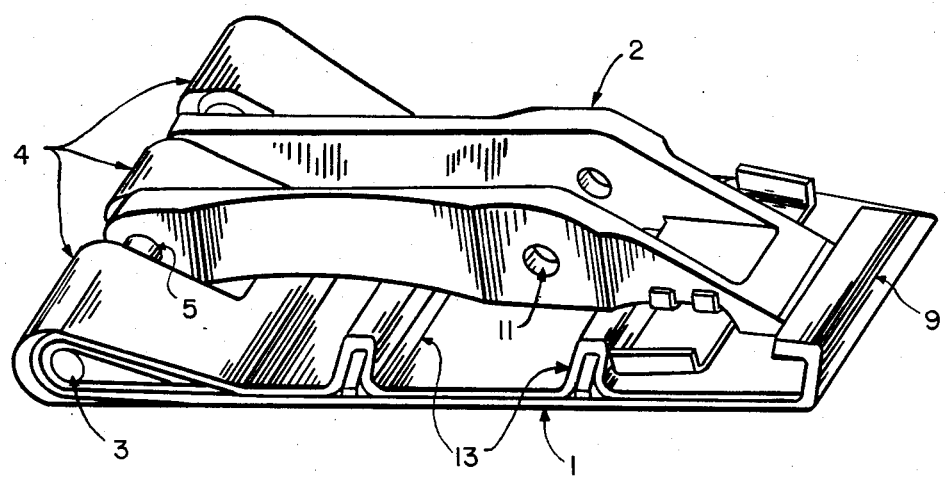

DUAL MATERIAL EXHAUST NOZZLE FLAP

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of variable area exhaust nozzles, and specifically to an exhaust nozzle flap composed of dual materials for use with turbojet engines.

The performance characteristics of today's state-of-the-art turbine engines are limited by the high temperature capabilities of their materials of construction. The strength and stiffness properties of metal alloys used in turbine engines degrade rapidly as temperatures exceed 1800° F. Engines capable of performing at higher temperatures have the potential for improved specific fuel consumption and efficiency. As such, engine designers are constantly seeking higher temperature materials and design to achieve this capability. In practice, turbines with high temperature components now resort to the use of air cooling and complex (and therefore costly) hardware designs to keep the materials of construction within acceptable temperature limits. The diversion of cooling air from the engine cycle to achieve this however, acts to reduce overall engine efficiency. Therein lies the challenge—the application of a new family of materials that can operate at extreme temperatures without cooling air.

Carbon-carbon composites have the potential for providing air-breathing engine designers a lightweight (low density), high temperature, high strength-to-weight material for a number of applications. Carbon-carbon composites maintain strength and stiffness properties up to approximately 4000° F. In short-life engines, such as a cruise-missile engine, carbon-carbon has the potential to provide a high performance payoff and may find application in very highly stressed components such as turbine disks or bladed disks (blisks). Other components for short-life engines include nozzle vanes, combustor liners, turbine shrouds, and perhaps, even shafts.

Another class of engine—the long life engine for the tactical fighter—can benefit from carbon-carbon composite materials. Most augmented turbofan engines are equiped with outer nozzle flaps to control the airflow over the rear of the engine installation. However, these turbojet engines have exhaust gas temperatures above the limit of practical heat resistant metallic materials. The only available coolant for cooling such exhaust nozzle parts as the flaps is compressor air. Compressor bleed is a highly undesirable source of coolant because of the resulting reduction in engine efficiency and thus aircraft range. Exhaust nozzles constructed of materials which will operate above the limits of metals and will tolerate the extreme exhaust gas temperatures of modern turbojet engines without need of cooling provisions would be of great benefit to engine efficiency.

The task of providing an exhaust nozzle flap which is capable of resisting the extreme exhaust gas temperatures of turbojet engine is alleviated, to some degree, by the following U.S. Patents, which are incorporated herein by reference:

U.S. Pat. No. 2,548,485 issued to I. Lubbock on Apr. 10, 1951;

U.S. Pat. No. 2,926,489 issued to F. Halford et al on Mar. 1, 1960:

U.S. Pat. No. 3,943,703 issued to S. Kronogard on Mar. 16, 1976; and

U.S. Pat. No. 4,201,611 issued to E. Stover on May 6, 1980.

The disclosure of Halford et al illustrates a prior art adjustable propulsion nozzle which, when composed of a single material, requires a means of cooling. In the disclosed device, cooling air is supplied by pipes and passages formed in the housing of the propulsion nozzle.

The Lubbock reference illustrates the use of a two-part combination of materials in a combustion chamber, including a metal for strength and a ceramic for heat resistance. However, in Lubbock, the lining is attached to ribs which are welded or otherwise fixed to the wall. A problem with fixing any lining to a support composed of a different material is that the different thermal expansion characteristics result in severe thermal stress conditions. One solution to the inequality of thermal expansion characteristics is supplied by the Kronogard reference. In Kronogard, slotted clamping members make thermal movement possible between a ceramic material and metal in a gas turbine power plant.

An alternative to conventional ceramics are carbon-carbon fabrications. The Stover reference discloses a method of fabricating compositions composed of carbon-carbon fiber composite materials.

Materials such as an oxidation protected composite of graphite in a carbon matrix (carbon-carbon) or siliconized silicon carbide, a ceramic type material, are available which will tolerate the extreme temperatures in question. It is difficult to construct highly loaded structural nozzle parts such as the nozzle flaps of these materials for two reasons:

(1) The characteristics of low ductility of ceramic materials and of the oxidation protecting ceramic case used on carbon-carbon materials render them unsatisfactory for use in nozzle flap elements such as cams, inter flap seal retention and positioning fittings and compact, thin wall hinges and lugs for concentrated load application.

(2) It is difficult to fabricate light weight flap structures because of the impracticability of providing high section modulus structural members (I and box sections) and intersecting rib configurations in composite construction. This difficulty tends to lead to low structural efficiency, thick sections and excessive weight in general. This difficulty also tends to inhibit the realization of the light weight design which would be expected from a high strength to density ratio material such as carbon-carbon composite.

In view of the foregoing discussion, it is apparent that there exists a need for an exhaust nozzle flap design which takes advantage of the heat resistant properties of carbon-carbon and siliconized carbide materials, and accomodates the relative thermal expansion between the heat-resistant layer, and a stiffer structural support layer. The present invention is directed towards satisfying that need.

SUMMARY OF THE INVENTION

The present invention is a turbojet engine exhaust nozzle flap capable of withstanding high exhaust gas temperatures. The flap is a two-part structure of high strength metal combined with either a carbon-carbon or ceramic material as a thermal insulation layer. The thermal insulation layer has lower strength than the metal support layer, but provides greater heat resistance.

The two materials, having substantially different rates of thermal expansion, are not bolted, riveted, or otherwise rigidly attached together but, rather, are clamped in a unique manner to allow relative movement therebetween. In the preferred embodiment, the manner of attachment entails the use of a flap hinge pin, which is inserted, at one end, between interleaved lugs formed in the metal support structures and the carbon-carbon insulation layer. The pin has two functions: it acts as the axle of a hinge which allows the flap to be moved; and it connects the insulative base of the flap to the metal support layer. Support at the tip of the flap is accomplished by retainer tabs which engage the two layers while allowing movement therebetween.

It is an object of the present invention to provide a turbojet exhaust nozzle flap capable of withstanding the extreme temperatures of a jet engine.

It is another object of the present invention to provide a turbojet exhaust nozzle flap using two materials: the first being an extremely heat resistant material, used as a base member; and the second being a relatively high strength support member.

It is another object of the present invention to provide a method of attaching the two materials which allows movement between the materials to accommodate their unequal thermal expansion characteristics.

These together with other objects features and advantages of the invention will become more readily apparent from the following detailed description when taken in conjunction with the accompanying drawing wherein like elements are given like reference numerals throughout.

BRIEF DESCRIPTION OF THE DRAWING

The sole FIGURE of the drawing is a view of the preferred embodiment of the present invention.

DETAILED DECRIPTION OF THE PREFERRED EMBODIMENT

The present invention is a turbojet exhaust nozzle flap which is composed of dual materials to withstand high exhaust gas temperatures.

In engine structures, most components are attached to each other by some type of bolted joint. This is due to a number of reasons, not the least of which is the ability to partially disassemble the engine for either inspection or repair. The exhaust nozzle flap of the present invention represents a departure from the practice of using bolted joints. The flap is a two-part structure of high strength metal, for support, with a thermal insulation layer. The two materials, which have substantially different rates of thermal expansion, are not bolted, riveted, or otherwise rigidly attached together but, rather, clamped in a unique manner to allow relative movement therebetween.

FIG. 1 is a view of the preferred embodiment of the present invention consisting of a base member (1) constructed of extreme heat resistant materials commonly nonmetallic carbon graphite composite materials (carbon-carbon) or ceramic type materials. This flap base is structurally backed up by a support member (2) preferably constructed of a material of greater strength than the base materials but of lesser heat resistance. The base is forced against the support by the pressure of the engine exhaust gas so that only secondary provisions are required for attachment of these two members. Attachment is simply accomplished without any fasteners (bolts or screws) to damage the base materials which tend to be susceptible to damage from direct bolting. The flap hinge pin (3) engages lugs on the base (4) and lugs on the support (5) as well as the flap mounting which is integral with the exhaust duct. The pin thus serves two functions. It is the flap hinge pin and also attaches the flap base (1) and the flap support (2). Support at the tip of the flap is accomplished by retainer tabs (9) which engage an extension of the flap support. This boltless attachment means has the additional advantage that it allows for relative thermal expansion of (1) and (2), as the temperatures vary in engine operation. Actuation mechanism elements such as link are attached to the support at the pin bearing area 11 to accomplish actuation for nozzle area variation.

The flap base makes use of a series of integrally formed ribs (13) which are easily formed, in the case of a carbon-carbon composite flap, by folding the upper layers of graphite fabric into pleats. The upper layers pass around and form the hinge lugs (4), then form the flat inner surface of the flap and finally form the retainer tab (9) at the end of the flap. This flap base construction is readily accomplished, using a single sheet of graphite fabric, by simple composite layup techniques. Strong hinge lugs are formed with continuous fibers and the ribs add stiffness and strength resulting in a lower weight flap than can be realized without the ribs.

The exhaust nozzle flap of FIG. 1 is designed for application to the nozzle of a turbojet exhaust system, and is approximately 6 inches in length. The entire base member 1, including the lugs 4, ribs 13, and retainer tab 9, is composed of a carbon-carbon fabrication. The metal support is a fiber-reinforced titanium material.

The manufacture of carbon-carbon constructs is a technique known in the art and described in disclosures such as the Stover reference, which need not be repeated here. However, the advantages of using carbon-carbon constructs as an insulation layer include the elimination of a need for applied cooling, and a reduction of weight due to its relatively low density.

The means of attaching the carbon-carbon base 1 to the support 2 allows for relative thermal expansion of flap base with respect to cooler support structure thus eliminating the long standing thermal stress induced cracking and short service life problems. The use of fixed fasteners, such as bolts, would result in the cracking of the base due to the unequal thermal expansion characteristics of the support and the base.

The rib and base geometry disclosed, with the unidirectional ribs, is readily manufacturable by plain fabric lay up techniques. In other words, the design of the base 1 can be implemented with 2-D fiber construction. The result is lower in cost than composite unit construction due to the simplicity of the fiber architecture (i.e., no intersecting ribs or 3D fiber construction required). The rib stiffened base requires retention at the ends only. No mid span fasteners are required.

Metal exhaust system parts are virtually all constructed of thin sheet materials in the order of 0.020-inch to 0.060-inch thick. It is correspondingly important that carbon-carbon composite designs be maintained at low thickness values in order to realize the weight saving potential. Carbon-carbon materials may be somewhat thicker than comparable metal designs and still save considerable weight due to the significantly lower density of carbon-carbon composites. In fact, a somewhat greater thickness is frequently required since these materials are not as strong as the metallic materials used in exhaust construction.

The thickness range of interest for the design of the carbon-carbon nozzle flap is 0.060 inch to 0.120 inch with edges tapered to thickness values in the range of 0.020 inch to 0.40 inch.

Carbon-carbon fabrications are presented as the preferred flap base in FIG. 1 as opposed to alternatives such as ceramic composed of siliconized silicon carbide materials. This determination was made after consideration of the possibility of a chemical reaction between a ceramic component and its support structure. The temperatures at contact areas for gas turbine applications may be in excess of 2000° F. due to the thermal conductivity of the ceramic being considered. The depletion of the silicon from the ceramic could be deleterious due to formation of surface pits which then would act as stress risers. In the past, the area of contact between ceramic and ceramic, or ceramic and metal, has been the site of failures in several engine programs. Failure at contact areas is due to high stress concentrations caused by the inability of ceramics to deform plastically when experiencing point loading.

Additionally, the concern with lug tearout failure was given special consideration. The flap was designed so that the fibers used in construction of the carbon-carbon flap base are continuous and pass around the hinge pin. This fiber architecture placed the fibers in tension thus minimizing concern with tearout failure and giving the advantage of a compact hinge which is important in the design of efficient engine exhaust nozzles.

There are three fundamental elements in a specific carbon-carbon composite which distinguish it from any other carbon-carbon composite. These are the fiber used, the geometry or architecture of fiber assembly, and the matrix material. For each of these elements there are numerous subsidiary characteristics which are also of greater or lesser, but seldom of no importance regarding the properties and performance of the composite. The result of this wide latitude in choice of constituents is that a carbon-carbon composite is usually designed for a given application prior to its fabrication instead of tailoring the design of the structure or component to fit the properties of the material. In practical circumstances, the optimum solution is the product of close cooperation between the designer and materials specialist.

One advantage of carbon-carbon utilization is the design tailorability afforded by various fiber and matrix choices. In addition to substrate material choices, the designer has tailorability in the choice of carbon-carbon substrate construction. For example, the design of a nozzle flap as shown in FIG. 1 consists basically of a base member with two structural ribs. For this component, the fabric laminations of the base are oriented so that the fibers run axially (in direction of exhaust flow) and transverse. It is considered important that fibers are oriented in the transverse direction since a major loading mode of the flap base is transverse bending due to the combined effect of the flap pressure load and the load applied at the flap edges by the pressure loaded seals. In this design approach, the support member reinforces the base in the axial direction, and distributes the actuation link force over the flap base. Since the actuation link is always acting to force the support member against the flap base, there should be no tension at the joint connecting the ribs and base, and the joint strength should be adequate even in view of the characteristically low strength of the carbon matrix material. However, the use of stitching or weaving is under consideration as a means of providing a more positive joint.

The load at the flap hinge in some nozzle configurations changes direction as the nozzle opens and closes. In such a design, two pairs of hinge lugs should be used in order to avoid lug tear-out or delamination due to this load reversal. The center pair will be incorporated into the flap base and are well adapted to handle the reverse load when the nozzle is closed. These lugs deliver the axial loads directly into the flap base by way of compressing and shear loading.

The support structure 2 illustrated in FIG. 1, may be constructed of any of the metals currently used in the art. However, in the preferred embodiment, the support structure is selected from one of the conventionally used fiber-reinforced titanium materials.

The titanium aluminides are a distinct class of materials designated as intermetallic compounds which offer a distinct temperature extension of lightweight materials. These special intermetallic compounds permit the use of titanium bearing alloys at temperatures as great as 600° F. higher than conventional titanium alloys. This will permit their usage in combustor and exhaust sections of the engine where lightweight-high-temperature materials are of paramount value.

These intermetallic compounds, based on titanium with 33% and 50% aluminum added, have unique crystal structures and high melting points which account for the excellent oxidation and creep resistance they exhibit. The advantages of titanium aluminides include: low density (0.14–0.17 lb/in$^3$); low coefficient of expansion ($5.0 \times 10^{-6}$ in/in/°F.) and high melting points (2,650° F.–3,000° F.). Additionally, components composed of titanium aluminides have been determined to have long term service temperatures in the range of 1,200°–1,550° F.; and short term service temperatures in the range of 1,300°–1,700° F. The fiber-reinforced titanium materials should span the range of temperature regimes for low temperature fan/compressor applications to high temperature turbine/exhaust nozzle applications.

Using the design principles described above, a set of eight carbon-carbon exhaust flaps were fabricated, installed on an engine exhaust nozzle, and exposed to 50 hours of engine testing under operational engine cycle conditions. The flaps were maintained at temperatures of up to 1050° F. during engine operation. No significant degradation of the carbon-carbon flaps, either weight loss or visual surface damage, was exhibited after exposure to the engine environment. In operation, the carbon-carbon exhaust flaps of the present invention are expected to withstand 2,000 hours in an engine like the F404.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:
1. An exhaust nozzle flap comprising:
   a support member having a first set of lugs at one end and a tip at its other end;

a base member composed of heat resistant materials, said base member having a second set of lugs at one end and a retainer flap at its other end, said base member being attached to said support member in a manner which allows relative movement therebetween by having its second set of lugs interleaved with the first set of lugs of the support member and said retainer flap encompassing said tip of said support member thereby holding it in place while allowing for differences in thermal expansion between said support member and said base member; and a hinge pin inserted between said first and second set of lugs of said support member and said base member, said hinge pin thereby connecting said support member to said base member.

2. An exhaust nozzle flap, as defined in claim 1, wherein said base member comprises a structure composed of materials selected from a group containing: a ceramic formed from siliconized silicon carbide, and a carbon-carbon fabrication formed from a nonmetallic graphite composite.

3. An exhaust nozzle flap comprising:

a support member having a first set of lugs at one end and a tip at its other end;

a carbon-carbon base member having a second set of lugs at one end and a retainer flap at its other end, said carbon-carbon base member being attached to said support member in a manner which allows relative movement therebetween by having its second set of lugs interleaved with the first set of lugs of the support member and said retainer flap encompassing said tip of said support member thereby holding it in place while allowing for differences in thermal expansion between said support member and said carbon-carbon base member; and a hinge pin inserted between said first and second set of lugs of said support member and said carbon-carbon base member, said hinge pin thereby connecting said support member to said carbon-carbon base member.

4. An exhaust nozzle flap, as defined in claim 3, wherein said carbon-carbon base member has a plurality of ribs on its surface between it and said support member.

5. An exhaust nozzle flap, as defined in claim 4, wherein said carbon-carbon base member, including said plurality of ribs, said retainer flap, and said second set of lugs, are integrally formed in a continuity of a single sheet of graphite fabric, said ribs being formed by folding said single sheet of graphite fabric into pleats, and said retainer flap and said second set of lugs being formed by folding said single sheet of graphite fabric over at its ends.

6. An exhaust nozzle flap, as defined in claim 5, wherein said single sheet of graphite fabric comprises a fabric sheet with continuous fibers, said continuous fibers running perpendicularly to said plurality of ribs to pass around an area occupied by said base member, said continuous fibers thereby making said second set of lugs resistant to tearing when said exhaust nozzle flap is in use.

7. An exhaust nozzle flap, as defined in claim 6, wherein said single sheet of graphite fabric includes fabric sheets having a thickness selected from a range of 0.60 inches to 0.020 inches.

* * * * *